April 27, 1943.    J. J. ORMOND    2,317,550
PROJECTION DEVICE
Filed June 17, 1941

Inventor:
John J. Ormond
by Thomas W. Hamilton
Attorney

Patented Apr. 27, 1943

2,317,550

UNITED STATES PATENT OFFICE 2,317,550

PROJECTION DEVICE

John J. Ormond, Boston, Mass., assignor of two-thirds to Joseph D. Ramsey, Boston, Mass.

Application June 17, 1941, Serial No. 398,415

3 Claims. (Cl. 88—24)

This invention relates to a projection device and more especially to methods and apparatus for carrying out projection and photographic printing.

A principal object of the invention is to provide an improved method and apparatus for projecting subject matter. Another object of the invention is to devise a method of projection which makes use of relatively strong lighting means and avoids difficulties arising from excessive heating developing in conjunction with the use of high-powered lighting means. Another object of the invention is to provide a method and apparatus for carrying out photographic printing operations, especially in connection with reproducing images of multicolored designs on textile materials. Still another object of the invention is to improve methods of color separation, and a still further object of the invention is to provide a method and apparatus for securing novel grained effects in photographic printing.

The nature of the invention and its objects will be more fully understood from the following description of the drawing and discussion relating thereto.

Figure 1:
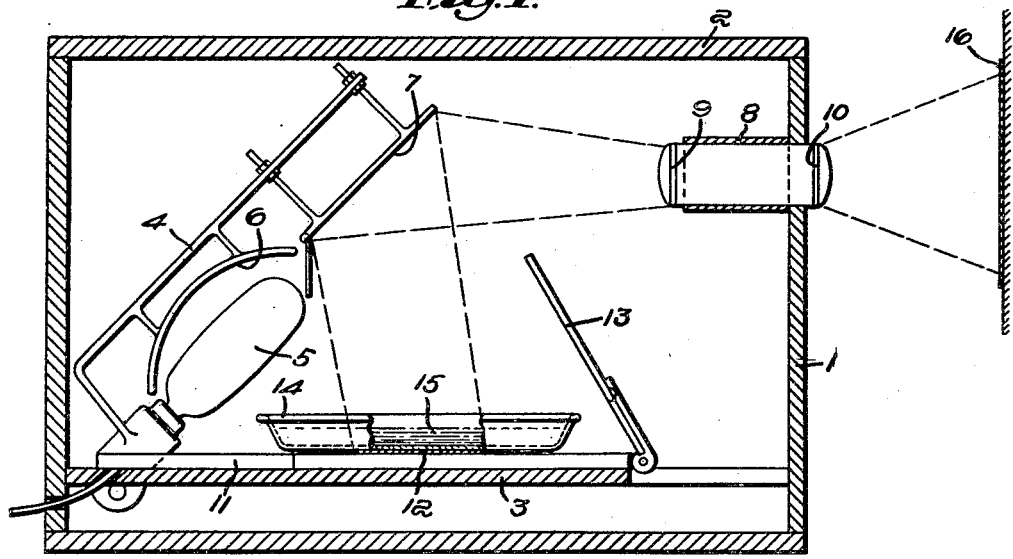
Fig. 1 is a diagrammatic view illustrating a projection apparatus of the invention.

Referring more in detail to the drawing, Fig. 1 illustrates a preferred apparatus of the invention in which numeral 1 refers to a casing provided with a cover 2 and a platform 3. Pivotally secured on the platform 3 is a frame 4 containing lighting means 5 and a concave mirror member 6. 7 refers to another mirror located above the mirror 6 and disposed angularly with respect to the platform 3. Through one end of the casing is mounted a cylinder 8 containing inner lens 9 and outer lens 10.

Numeral 11 refers to a base on which is supported subject matter 12 carrying an image desired to be projected. The base 11 and subject matter 12 are protected by a shield 13 angularly disposed at one side of the base 11. The subject matter 12 is spread out in a smooth, flat state on the base 11 and superimposed above it is a container 14 carrying a translucent fluid such as cold water 15.

In operation, light from the lighting means 5 passes through the translucent liquid 15 to the surface of the subject matter 12, which reflects light against the mirror 7. The latter member, in turn, reflects the reflected light image of the subject matter through lenses 9 and 10 to project the light image upon a suitable support 16. The support 16 may constitute a screen for receiving the projected image or, in a preferred form of the invention, it may constitute a light-sensitive surface adapted to be photographically exposed by the reflected image and thereafter form a printing element.

An important feature of the method of the invention and the apparatus described consists in the use of the fluid medium 15 interposed between the source of light and the subject matter to be projected or reproduced. It is pointed out that in order to secure suitable strong projection of the image of the subject matter, for some purposes, it is necessary to employ a relatively strong lighting means such as, for example, a 500-watt incandescent lamp bulb. With bulbs of this strength, there tend to develop relatively high temperatures, which may be of such intensity as to preclude the use of the lighting element in close proximity to the subject matter to be reproduced, or to allow its use for only limited periods of exposure. The fluid medium 15, of some suitable type as the water noted, allows light to pass through it and at the same time prevents heat from being directed against the surface of the subject matter. If desired the water 15, or other fluid medium, may be cooled by some suitable refrigerating means, to maintain any desired temperature suitable for completely shutting out heat.

By thus avoiding heating difficulties, it becomes possible to use a relatively small casing member for projection and photographic printing work with relatively high-powered lighting means, adapted to provide excellent projection. The use of the fluid medium, especially as in a container such as 14, further is advantageous in that it tends to hold or maintain the subject matter in a uniformly flat state, which facilitates more accurate reproduction. A still further advantage of the use of the fluid medium for projecting the subject matter consists in the fact that illumination of the subject matter may be continued for practically unlimited periods of time.

In a preferred method of the invention, an image of the subject matter 12 is projected upon a light-sensitive element 16 to form a photographic negative. While printing elements generally may be prepared in this manner, reference is particularly had to the preparation of photographic negatives from samples of textile goods having multicolor designs.

It is customary to prepare intaglio printing rolls for printing textile goods, in accordance with sample designs provided on small pieces of textile materials. Since such subject matter usually occurs in several colors, it is desirable to prepare color-separation negatives which are separately employed to prepare printing rolls for each of the colors.

Accordingly, therefore, the translucent fluid 15 may be colored to provide a filter element, generally corresponding to translucent glass or film colored in some suitable shade as red, yellow or green, by which light is reflected from only those portions of subjects occurring in one given color. A number of exposures are made on separate negative elements, in each case using differently colored fluids to obtain the desired color-separation negatives. Thereafter these negatives are employed to form printing members in some suitable manner. Various changes may be resorted to in connection with using colored liquid filters. For example, color plates may be prepared from multicolor photographs of subject matter, such as Kodachrome films, covered at one side with opaque materials, and still other changes may be resorted to.

A colored liquid filter is quickly prepared and provides true color tones such as are not as readily obtainable in solid color filter elements. The liquid filter is not affected by heat and is not subject to the presence of impurities such as commonly occur in solid filter elements. If desired, the colored fluid might be desired to be comprised by a colored gas instead of a colored liquid.

Figure 2:
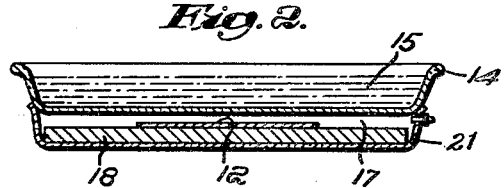
Fig. 2 is a view in cross section illustrating a modification of projection apparatus of the invention.
Figure 3:
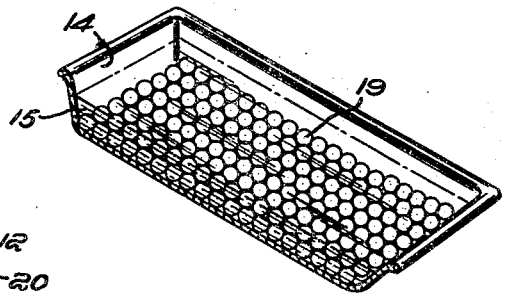
Fig. 3 is a fragmentary detail perspective view of a still further modified projection apparatus of the invention.

In Fig. 2, I have shown a modified type of projection apparatus which includes the container 14, together with the translucent fluid medium 15, and a vacuum member 21 associated in sealed relation with respect to the bottom of the container 14 to provide a vacuum chamber 17, in which is received a support 18 carrying subject matter to be reproduced 12.

The use of a vacuum holds subject matter to be reproduced in a flat state and provides well known photographic advantages. When the vacuum is combined with the translucent liquid, additional desirable results are obtained relating to strength, purity, and accuracy of the reflected image obtained from the subject matter 12.

Various other modifications in connection with the use of a fluid filtering means may be resorted to. For example, I may employ a layer of translucent spherical bodies 19, immersed in the translucent liquid 15 in the container 14. These spherical bodies preferably occur in contact with one another uniformly throughout the bottom surface of the container, and are adapted to provide a novel grain effect in the projected image obtained from light reflected through these bodies and the liquid medium 15. The spherical bodies may be formed of glass and other materials and be either colored or colorless.

Figure 4:
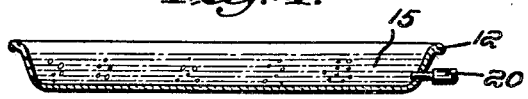
Fig. 4 is a view in cross section illustrating still another modified projection apparatus.

In a similar manner, other grain formations may be obtained in conjunction with the use of a translucent fluid, as for example by the use of an arrangement such as that shown in Fig. 4, in which the container 14 carrying the translucent fluid 15 is provided with a tubular member 20, connected to a source of compressed air. By this means, the fluid 15 may be gently agitated while reflection of light therethrough is occurring. This results in novel distorted reproduction effects in the projected image. Various other means of agitating the fluid may be resorted to, as for example chemical reagents of an effervescent type, and other agents.

It will be seen that the invention provides a novel method and apparatus for projecting light images. Heating difficulties are avoided, improved color filtering operations are disclosed, and means for obtaining novel graining effects are set forth.

While I have shown a preferred embodiment of the invention, it should be understood that various other changes and modifications may be resorted to, in keeping with the spirit of the invention as defined by the appended claims.

I claim:

1. A device for the projection of images of opaque objects comprising a substantially light tight casing, a source of light in said casing, opaque subject matter desired to be projected located in the base of said casing, reflecting means and lens means adapted to pass light rays reflected from the subject matter to a projection surface outside of the casing, a receptacle lying in contact with the surface of the subject matter in the base of the casing, said receptacle containing a fluid medium for absorbing heat from the illuminating means.

2. An apparatus for projecting subject matter which includes a closed casing, illuminating means in the casing, lens means located in one side of the casing, a reflector member adapted to pass light rays through the lens, opaque subject matter supported in the base of the casing, a receptacle superimposed upon the surface of the said opaque subject matter, a translucent liquid contained in the receptacle, said liquid adapted to permit rays of light to pass therethrough and be reflected outwardly, thereby to provide a cooling effect.

3. A projection device comprising a closed casing, illuminating means in the casing, lens means, opaque subject matter mounted in the base of the casing, and reflecting means adapted to reflect an image from the subject matter through the lens to a projection surface, a container lying in contact with the surface of the subject matter at the base of the casing, a translucent liquid in the container, a plurality of translucent spherical bodies supported at the bottom of the container, said spherical bodies adapted to provide a grain in an image projected from the surface of the subject matter to the said projection surface.

JOHN J. ORMOND.